United States Patent

Lone

[15] 3,698,004
[45] Oct. 10, 1972

[54] RECORDER WITH TIME LINE GENERATOR AND INTERVAL ENCODER

[72] Inventor: Peter R. Lone, Denver, Colo.
[73] Assignee: Honeywell Inc., Minneapolis, Minn.
[22] Filed: Aug. 31, 1971
[21] Appl. No.: 176,585

[52] U.S. Cl.....................................346/23, 346/110
[51] Int. Cl..............................................G01d 9/00
[58] Field of Search........346/23, 110, 109, 108, 107, 346/45, 49

[56] References Cited

UNITED STATES PATENTS

| | | |
|---|---|---|
| 3,348,229 | 10/1967 | Freas...........................346/23 |
| 3,402,388 | 9/1968 | Tucker..................346/110 X |
| 3,454,953 | 7/1969 | Lloyd et al....................346/23 |

*Primary Examiner*—Joseph W. Hartary
*Attorney*—Arthur H. Swanson et. al.

[57] ABSTRACT

There is disclosed herein a coding system for indicating the periodicity of generated time lines on a CRT/chart recorder. Code marks are generated by selectively unblanking the beam of the CRT whereby to generate the code marks. The encoding means is correlated with means for selecting the periodicity of the time lines.

9 Claims, 4 Drawing Figures

INVENTOR.
PETER R. LOWE

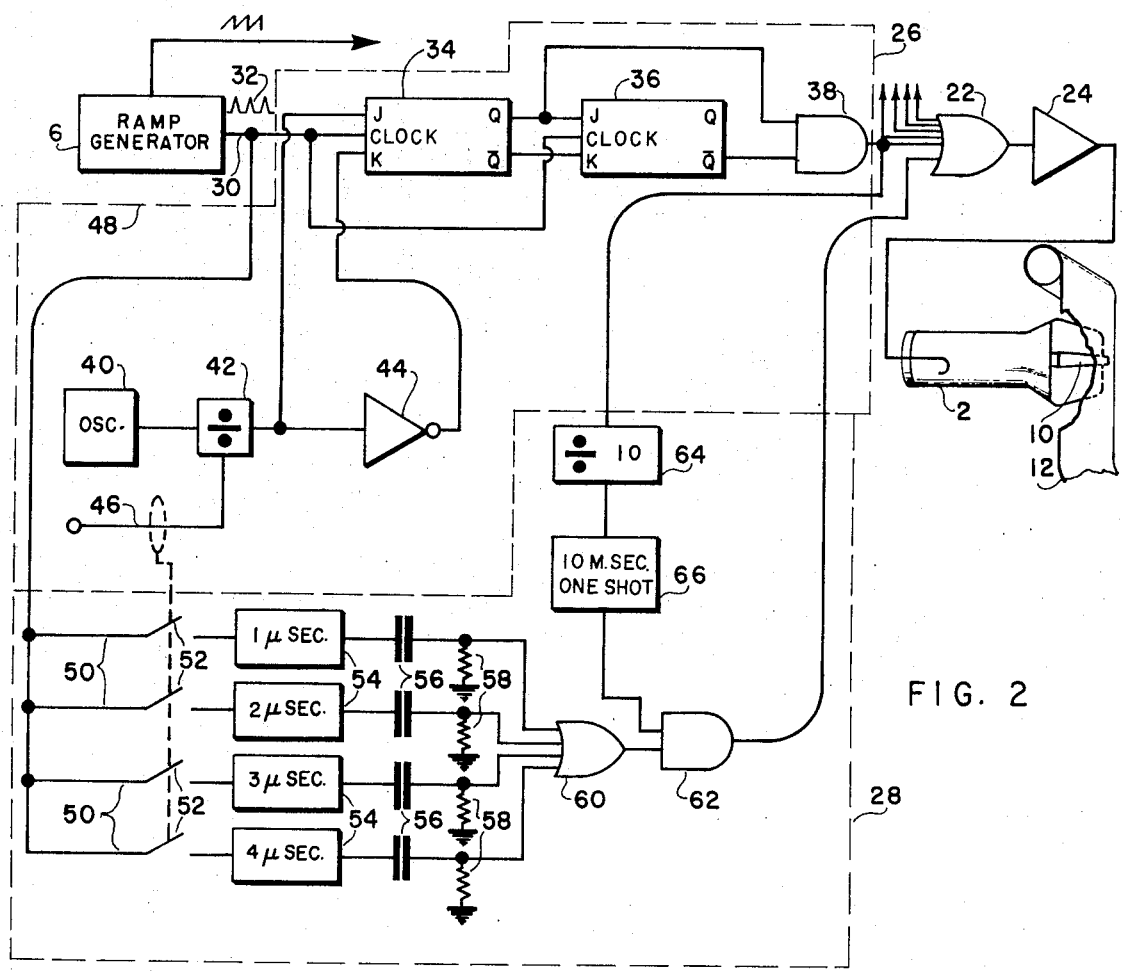
FIG. 2
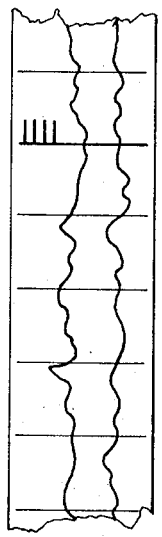
FIG. 3
```
10. SEC. ||||
 1 SEC. |||
 .1 SEC. ||
 .01 SEC. |
.001 SEC. ―
```
FIG. 4
INVENTOR.
PETER R. LOWE
BY *Lockwood D. Burton*
ATTORNEY

RECORDER WITH TIME LINE GENERATOR AND INTERVAL ENCODER

The present invention relates to optical recording techniques, and more particularly to recording means having a cathode ray tube light source cooperating with a light sensitive recording medium.

There has been disclosed, heretofore, a recording system wherein one or a plurality of record traces may be recorded on a light sensitive recording medium by a transversely scanning light trace, such as the cathode ray beam of a cathode ray tube which is caused to sweep back and forth across a single line on the face of the tube. Fiber-optic means are provided to effect an optical coupling between the light signals produced at the inner face of the tube and the surface of a light sensitive recording medium. In a preferred embodiment of that invention, the recording medium is a direct writing print out paper providing an immediately visible trace. In that system, the trace is formed by blanking the cathode ray beam as it sweeps across the face of the tube, then selectively, momentarily unblanking the beam at a position in each of its sweeps corresponding to the instantaneous magnitude of an input signal. Successive sweeps of the beam while the paper is moving relative to the tube face produces a trace representative of each of the input signals.

It is not uncommon in such recorders to cause the scanning beam to be unblanked for a full-width sweep on a periodic basis to cause a transverse time line to appear on the ultimate record. Such time lines clearly bear a significant temporal relationship with the recorded data signals recorded at the same time on the same chart, even if there should be irregularities in the speed of advance of the chart, or recording medium. It should be apparent that such time lines may be recorded with any of a number periodicities. In order for the relationship between the time lines and the recorded data to be readily apparent, it becomes desirable to indicate the periodicity of the time lines on the recorded chart. It is therefore an object of the present invention to provide means for generating time lines on a chart and for indicating the periodicity of the time lines.

It is another object of the present invention to provide a recording system wherein time lines are generated, with selectively variable periodicity, and the selected period is indicated on the chart.

It is a further object of the present invention to provide a means for coding generated time lines on a chart to indicate the periodicity thereof.

In accomplishing these and other objects, there has been provided, in accordance with the present invention, a CRT multiple trace recorder wherein data signals are compared in magnitude with a ramp signal. The ramp signal is also used to drive the deflection coil of the CRT. The beam of the tube is normally blanked until such time as there is an indication of coincidence between the ramp and a data signal; whereupon the beam is momentarily unblanked to provide a data trace segment. Means are also provided to unblank the beam for a full trace width by selected ones of the ramp signal retrace portions to produce variably periodic time lines, as well as data traces, on an associated record medium. In order to identify the periodicity of the time lines, code marks such as pips varying in number in accordance with the selected rate, are placed on or near one end of selected ones of the time lines. For example, every 10th time line would bear such code marks.

A better understanding of this invention may be had from the following detailed description when read in connection with the accompanying drawings in which:

FIG. 2 is a schematic diagram of a system embodying the present invention;

FIG. 3 is an illustration of a fragment of a chart record produced in accordance with the present invention; and FIG. 4 is a chart indicating a typical encodement in accordance with the present invention.

Figure 1:
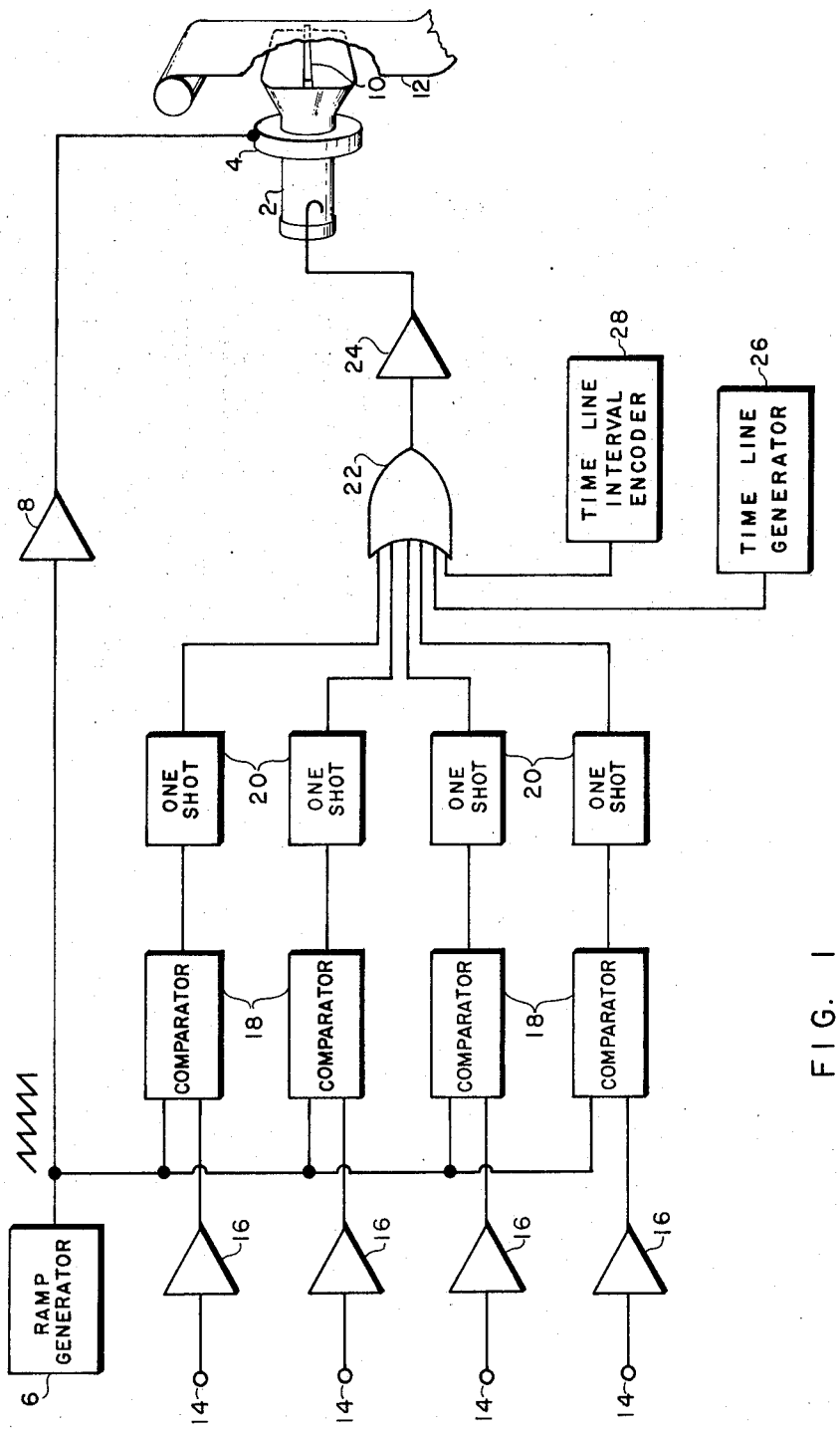
FIG. 1 is a block diagram of a recording system to which the present invention may be applied.

Referring now to the drawings in more detail, there is shown, in FIG. 1, a block diagram representative of a recording system to which the present invention may be applied. In accordance with standard techniques, not here shown, an electron beam is formed in a cathode-ray tube 2. The beam is caused to sweep back and forth in substantially a single horizontal line by a deflection coil 4. A ramp generator 6 produces an appropriate sawtooth wave signal which is amplified by a deflection amplifier 8 and applied to the coil 4 to effect the aforementioned deflection. The impingement of the generated electron beam on the inner surface of the face of the cathode-ray tube 2 produces a light trace in the phosphor applied thereto. An array of so called fiber optics 10 collects the light pattern thus generated and transmits it to the surface of a record member 12. The record member 12, of course, has a light sensitive surface thereon which responds to the light images transmitted by the fiber optics 10 to produce a visible trace. Preferably the record member is of the type which is known as direct print out paper. Such paper provides an immediately visible trace without the necessity of additional processing of the image surface subsequent to exposure to the light pattern. In the preferred embodiments of the invention, the intensity of the beam in the cathode-ray tube is ordinarily blanked, that is, maintained at an intensity insufficient to produce a visible trace on a record member 12. One or more data signals are applied at the input terminals 14 of the several data channels. There are four such data channels shown in FIG. 1 as being representative of any desired number of channels. The data signals applied to each of the input terminals 14 is amplified in a buffer amplifier 16. The output of the buffer amplifier 16 is applied as one input signal to a signal comparator 18 the ramp signal from the ramp generator, in addition to being applied to the deflection amplifier 8, is also applied as the other input signal to each of the comparators 18. Thus, for each cycle of the ramp signal, the comparators 18 compare the value of the signals applied through the buffer amplifiers 16 with the instantaneous value of the ramp signals. When an identity of single magnitude occurs at any of the comparators, that comparator produces an output signal which is applied as a trigger signal to a one-shot monostable multivibrator, 20. The output pulse from the one-shot 20 is applied through an OR gate 22 to an unblanking amplifier 24. The output of the amplifier 24 is applied to a control electrode of the cathode-ray tube to apply a momentary unblanking pulse therethrough. Inasmuch as such unblanking pulse is produced as a result of a comparison of the magnitude of an input signal with a single cycle of the ramp signal, the resultant bright spot on the face of the cathode-ray tube will appear at a position along the deflection of the beam which is representative of the magnitude of the input signal. If, as shown, several such input signals are applied simultaneously to the input terminals 14, such several input signals will all be simultaneously compared with the same ramp signal and each will produce a corresponding unblanking pulse. Thus each such applied input signal will produce its own unique bright spot along an individual sweep of the beam of a cathode-ray tube. It is, of course, apparent that a similar comparison and pulsing will occur on each cycle of a ramp signal producing a succession of bright spots on successive traces or sweeps of a cathode-ray beam. These succession of bright spots, when translated to the surface of the recording medium 12 by the fiber optics 10 as a recording medium is being drawn at a predetermined velocity past the face of the tube, produces effectively a multiple trace recording representative of the varying magnitudes, independently, of the several applied input signals.

In addition to the several data channels being connected to the unblanking amplifier 24 through the OR gate 22, a time line generator 26 and a time line interval encoder 28 also has their respective output signals applied through the OR gate 22 to the unblanking amplifier 24. The structure and operation of these elements may be more readily understood with reference to FIG. 2.

In FIG. 2, the ramp generator 6 is illustrated as having a second output lead 30 on which are a series of pulses 32 representative of the retrace portion of the primary ramp signal produced by the ramp generator 6. The pulses 32 are applied as input signals to the clock terminal of a first JK flip-flop 34 and to the clock input of a second JK flip-flop 36. The Q output of the flip-flop 34 is connected to the J input of the second flip-flop 36. Similarly, the Q output of the first flip-flop connected to the K input of the second flip-flop 36. The Q output of the first flip-flop 34 is also applied as one input signal to an AND gate 38. The Q output of the second flip-flop 36 is connected as the other input to the AND gate 38.

A timing oscillator 40 has its output connected to a variable frequency divider 42. The output of the variable frequency divider is connected as input to the J input terminal of the first flip-flop 34. The outputs of the frequency divider is also applied as input signal to an inverter 44. The output of the inverter 44 is connected as input signals to the K input terminal of the first flip-flop 34. Means are provided, as represented by the lead 46, for selectively controlling the operation of the frequency divider 42. As will be seen hereinafter, the output of the frequency divider 42 controls the periodicity, or repetition rate, of the appearance of time lines on the resultant chart.

The output of the AND gate 38 is applied to one of the input terminals of the OR gate 22, the output of which is, in turn, connected to the unblanking amplifier 24 as described in connection with FIG. 1. As before, whenever a signal is applied to the input of the amplifier 24, the beam of the cathode-ray tube 2 is unblanked, allowing a visible trace to be recorded on the chart 12 for the duration of that signal.

The characteristic operation of the JK flip-flop is such that when a logical "1" appears at the J input terminal, a pulse applied to the clock inputs will cause a logical "1" to appear at the Q output terminal and a logical "0" at the $\overline{Q}$ output terminal. Similarly, when a logical "1" appears at the K input terminal a pulse applied to the clock input terminal will cause a logical "0" to appear at the Q output terminal and a logical "1" to appear at the $\overline{Q}$ output terminal. With this in mind, it can be seen that the frequency divider 42 may be controlled to provide an output signal of a frequency which corresponds to the desired time interval between time lines recorded on the chart 12. The control represented by the lead 46 may for example effect a control over the division characteristic such that the oscillatory output occurs once every 10 seconds, once every second, once every 0.1 second, etc. When the output of the divider 42 goes positive, a logical "1" is applied to the J terminal of the first flip-flop 34. The trailing edge of the next pulse 32 from the ramp generator 6 applied to the clock input terminal of the flip-flop 34 causes a logical "1" to appear at the Q output of that flip-flop. That logical "1" is also applied to one input terminal of the AND gate 38. Since it was the trailing edge of the pulse 32 which caused the output just described to occur the second flip-flop had been preconditioned with a logical "1" on the K input terminal. The application of the same pulse 32 to the clock input of the second flip-flop 36 causes a logical "1" to appear at the $\overline{Q}$ output of that second flip-flop 36. That logical "1" is applied to the other input terminal of the AND gate 38 causing an output signal to appear at the output thereof, applied through the OR gate 22 the unblanking amplifier 24 to the control element of the cathode-ray tube 2. The next occuring retrace pulse 32 from the ramp generator 6 causes no change in the operating characteristic of the first flip-flop 32, assuming that the logical "1" from the divider 42 is still applied to the J terminal of that flip-flop 34. However, that second pulse 32 from the ramp generator 6 is also applied to the clock input of the second flop-flop 36 which has now been preconditioned by the previous pulse to have a logical "1" at its J input terminal. That second clock pulse applied to the second flip-flop 36 causes a logical "0" to now appear at the $\overline{Q}$ output thereof, thereby turning off the AND gate 38 and terminating the unblanking signal applied to the controlled electrode of the cathode-ray tube 2. Thus, it may be seen that the beam of the cathode-ray tube 2 has been unblanked for a period corresponding to one scan line of the deflection system. That unblanking produces a signal time line to appear on the record member 12. Subsequent retrace pulses 32 will not cause the beam of the cathode-ray tube 2 to be unblanked until after both flip-flops 34 and 38 have been reset by the change in signals applied to the J and K terminals of the first flip-flop 34 by the signals from the frequency divider 42 and the inverter 44. That is, not until the output of the frequency divider has first gone negative and then returned to positive will the system be conditioned to generate at another time line. Thus, the frequency of the output of the frequency divider 42 determines the repetition rate or time interval of the time lines produced on the record member 12.

It has been mentioned hereinbefore that the frequency divider 42 may be selectively controlled to produce time lines on the record member at any of several predetermined time intervals. If the interrelationship of the time lines and the recorded data, as illustrated in FIG. 3, is to be meaningful to one reviewing the records at a subsequent time, it becomes necessary to provide some means for identifying the time interval, or periodicity, of the time lines. To this end it is proposed that a series of marks nominally extending perpendicularly to the time lines be recorded adjacent selected ones of the time lines to provide a code indicative of the periodicity, or time interval.

In FIG. 4 there is shown a chart representative of a typical encodement in accordance with the present invention. In the exemplary embodiment, the combination of the oscillator 40 and the selectively variable frequency divider 42 may be arranged to provide a choice of time intervals such as shown in FIG. 4 wherein the available choices bear a decimal relationship with respect to each other. That is, the system may be selectively operated to produce time lines having intervals of 10 seconds, 1 second, 0.1 second, 0.01 second, and 0.001 second. In accordance with the suggested code, four perpendicular marks may be used to indicate the first available choice, three vertical marks the second available choice and so forth. Further, it is not necessary that the identifying code marks appear on each of the time lines, but may be placed adjacent only selected ones of the time lines. For example, in the illustrated embodiment, the encoding marks are positioned adjacent every 10th time line, as illustrated in FIG. 3.

To effect the encoding of the time line intervals as thus described, there has been provided a time line encoder 28 as briefly mentioned in connection with the discussion of FIG. 1. Details of an embodiment of that encoder are shown in FIG. 2. A lead 48 is connected to the ramp generator 6 to apply the retrace pulses 32 as input control signals to the encoder 28. A plurality of leads 50, four being illustrated, are each connected between the lead 48 through a switch 52 to a one-shot or monostable multivibrator.

The four illustrated one-shots 54 are individually characterized by having a progressively longer delay action. Thus, the upper most of the one-shots is illustrated as having a 1-microsecond delay, the second as having a 2-microsecond delay, the third as having a 3-microsecond delay, and the fourth as having a 4-microsecond delay. The output signal from each of the one-shots 54 is applied to an individual differentiator circuit comprising a capacitor 56 and a resistor 58. The differentiators are individually connected to the input terminals of an OR gate 60. The output of the OR gate 60 is connected to one input terminal of an AND gate 62. The output of the AND gate 62 is connected to one input terminal of the OR gate 22 which, as hereinbefore mentioned, is connected to the unblanking amplifier 24.

It will be recalled that the output signal from the AND gate 38 is a signal which represents a time line to be recorded on the chart 12. It will also be recalled that in a preferred embodiment of the present invention, the time line encoding marks were not to be applied to every generated time line but on some preselected submultiple of the time lines. To that end, the output of the AND gate 38 is connected to a frequency divider 64. The output of the frequency divider 64 is connected through a delayed one-shot or monostable multivibrator 66 to the other input of the AND gate 62.

In operation, the switches 52 are coordinated with the control applied through means 46 to the frequency divider 42. While the switches 52 are shown, for purposes of illustration, as mechanical switches, it is apparent that they may be suitable electronic switches of any particular type now well known in the art. Thus, if the frequency divider 42 is controlled by the means 46 to effect the generation of a time line, for example, once every 10 seconds, then, all four switches 52, according to our illustrated code, will also be closed. With all the four switches 52 closed, a pulse 32 will be applied simultaneously to the input of all four of the one-shots 54. As mentioned before, each of the four one-shots 54 has its own characteristic delay. Thus the first of the one-shots will produce an output signal 1 microsecond after the application of the input pulse thereto. That output pulse is shaped by the differentiator 56, 58, and is passed through the OR gate 60 to the input of the AND gate 62. Assuming the AND gate has been enabled by a signal from the time line generator 26, the pulse passed by the OR gate 60 will be gated through the gate 62 to the OR gate 22 and the unblanking amplifier 24, to the control electrode of the CRT tube. Thereupon, the beam of the CRT will be unblanked momentarily to produce a first dot on the record chart adjacent a selected one of the time lines. One microsecond later, a second dot will be generated then a third, then a fourth, during the same sweep of the beam of the cathode-ray tube across the face thereof. A second retrace pulse 32 in the train of pulses produced by the ramp generator 6 will cause a second series of dots to be generated on the chart immediately adjacent the previously generated dots. Similarly, each successive retrace pulse 32 will produce a series of dots, as hereinbefore mentioned, so long as the gate 62 is enabled by a signal from the time line generator 26.

In a preferred embodiment of a recording system constructed in accordance with the present invention, the divider 64 was arranged to enable the gate 62 for every 10th time line generated on the chart 12. In order to keep the gate 62 enabled for a period of time long enough for a succession of dots at each position on the chart to provide a reasonable desirable perpendicular line, the delayed one-shot 66 is interposed between the output of the divider 64 and the enabling input of the gate 62. In the exemplary embodiment, the one-shot was designed with a 10-millisecond delay. At a nominal chart speed of 10 inches per second, a 10-millisecond delay of the one-shot 66 will result in code marks one-tenth of an inch in length. The operation of the one-shot 66 is such that the gate 62 is enabled upon the application of a pulse from the divider 64 and is held in the enabled condition during the delay period of the one-shot 66. In other words, with the 10-millisecond delay in the one-shot 66, the gate 62 is enabled for 10 milliseconds following the application of a pulse from the divider 64. The scanning frequency of the beam in the cathode-ray tube, that is, the repetition rate of the pulses 32, is sufficiently high relative to the speed of advance of the chart 12 past the face of the tube 2 that the adjacent dots in each of the code marks are substantially in juxtaposition. Thus, in the system described so far there will be produced a time line interval code of four marks produced as shown in FIG. 3 and on the top line of FIG. 4.

On the other hand, if a different periodicity, or time line interval, is selected, then a different number of the switches 52 will be closed. For example, if the first three of the switches are closed and the fourth one open, then three code marks will be generated as illustrated on the second line of FIG. 4. Similarly, if the periodicity corresponds with two code marks as shown on the third line of FIG. 4, then only the first two of the switches 52 will be closed. If only the first of the switches 52 is closed, then a single code mark as shown on the fourth line of FIG. 4 will be generated. The fifth periodicity may be indicated by having all four of the switches open, in which condition no code marks would appear on the selected time line as shown on the bottom line of FIG. 4.

Thus, there has been provided, in accordance with the present invention, means for generating on a chart, time lines with a variable repetition rate or periodicity and means for indicating, at selected ones of the thus generated time lines, a code to indicate the selected periodicity.

The embodiments of the invention in which an exclusive property or privilege is claimed are defined as follows:

1. In a recording system wherein a record is made on a light sensitive record member by means providing a transversely scanning light trace, and wherein means are provided for selectively blanking and unblanking said light trace in accordance with one or more data signals, the improvement comprising timing means also connected to said blanking means for periodically unblanking said light trace for a full scan time interval to produce periodic time lines on said record member, encoding means further connected to said blanking means and responsive to said timing means for generating coded indicia adjacent selected ones of said time lines on said record member indicative of the periodicity of said time lines.

2. The invention as set forth in claim 1 wherein said means for providing a transversely scanning light trace comprises a cathode-ray tube having a single axis deflection means, said deflection means including a ramp signal generator means for producing a sawtooth wave form signal having a ramp portion and a retrace portion, and wherein said blanking means includes an amplifier connected to a control electrode of said cathode-ray tube, control signals applied to said amplifier being operative to selectively blank and unblank the beam of said cathode-ray tube.

3. The invention as set forth in claim 2 wherein said timing means includes a selectively variable timing signal generator means, a signal control means, output signals from said timing signal generator means being applied to an input of said signal control means to selectively enable said signal control means, said ramp signal generator means including clock output means for producing clock signals representative of said retrace portion, means for applying said clock signal to another input of said signal control means, said signal control means being operative upon the coincidental application of said clock signals and signals from said timing signal generator means to produce an output signal commensurate with one cycle of said sawtooth wave form signal, and means connecting the output of said signal control means to the input of said amplifier whereby to unblank said beam of said cathode-ray tube in accordance therewith.

4. The invention as set forth in claim 3 wherein said timing signal generator means includes an oscillator means for producing a basic oscillatory timing signal, a selectively variable frequency divider connected to the output of said oscillator means for producing a selectively variable timing signal which is a selected submultiple of said basic oscillatory timing signal, and inverter means connected to the output of said frequency divider for producing a reverse image of said selectively variable timing signal.

5. The invention as set forth in claim 4 wherein said control means includes binary logic means characterized in that the coincident application of a first clock signal and a selectively variable timing signal is operative to initiate an output signal, the application of said timing signal and a second clock signal being operative to terminate said output signal and to disable said control means until the application of a second timing signal.

6. The invention as set forth in claim 3 wherein said encoding means includes a plurality of signal delay means, connection means for selectively connecting said delay means in parallel to said clock output means of said ramp signal generator means, said delay means each having a unique delay characteristic with respect to the others, gating means connected to the output of said delay means to apply output signals therefrom to the input of said amplifier to momentarily unblank said beam in response to each such delay signal, said connection means being correlated with said selectively variable timing means to selectively connect said delay means to said clock output means in accordance with a predetermined relationship with respect to said selectively variable timing signal.

7. The invention as set forth in claim 6 wherein the delay introduced by each said delay means is small relative to said scan time interval, and wherein said first delay means has a predetermined minimum such delay and successive delay means provide successively longer delays by uniform increments whereby to produce uniformly spaced code marks on said record member.

8. The invention as set forth in claim 6 wherein said gating means connected to the output of said delay means includes an OR gate the input of which is connected to all of said delay means and an AND gate having one of two inputs thereof connected to the output of said OR gate; and characterized by the addition of frequency divider means connected to the output of said signal control means, and a monostable binary element having a predetermined delay characteristic, said binary element having an input connected to the output of said frequency divider means and having an output connected to the other of said inputs of said AND gate whereby to apply said coded indicia adjacent selected ones of said time lines.

9. The invention as set forth in claim 8 wherein said delay means comprise monostable binary elements each having an individual delay characteristic separated from the next adjacent element by substantially one microsecond increments, and wherein said monostable binary element connected between said frequency divider and said AND gate has a characteristic delay of substantially 10 milliseconds.

* * * * *

UNITED STATES PATENT OFFICE
CERTIFICATE OF CORRECTION

Patent No. 3,698,004    Dated    October 10, 1972

Inventor(s) Peter R. Lowe

It is certified that error appears in the above-identified patent and that said Letters Patent are hereby corrected as shown below:

On the cover sheet [72], "Peter R. Lone", should read -- Peter R. Lowe -- .

Signed and sealed this 8th day of May 1973.

(SEAL)
Attest:

EDWARD M.FLETCHER,JR.
Attesting Officer

ROBERT GOTTSCHALK
Commissioner of Patents